United States Patent [19]

Dilchert

[11] 3,863,573

[45] Feb. 4, 1975

[54] SOLID PROPELLANT CHARGE HAVING A SHORT BURNING TIME FOR ROCKET ENGINES

[75] Inventor: Heinz Dilchert, Steyerberg, Germany

[73] Assignee: Dynamit Nobel Aktiengesellschaft, Postfach, Germany

[22] Filed: Aug. 7, 1972

[21] Appl. No.: 278,389

Related U.S. Application Data

[63] Continuation-in-part of Ser. No. 874,881, Nov. 7, 1969, abandoned.

[30] Foreign Application Priority Data

Nov. 9, 1968   Germany............................ 1808111

[52] U.S. Cl. ................................................ 102/101
[51] Int. Cl............................................... F42b 1/00
[58] Field of Search.......... 102/100, 101, 49.3–49.7, 102/38, 39, 40; 60/35.6 RS

[56]     References Cited
UNITED STATES PATENTS

| | | | |
|---|---|---|---|
| 694,295 | 2/1902 | Maxim | 102/100 |
| 751,386 | 2/1904 | Davis | 102/100 |
| 2,986,092 | 5/1961 | Murphey, Jr. | 102/100 |
| 2,995,091 | 8/1961 | Haymes et al. | 102/100 |
| 3,159,104 | 12/1964 | Hodgson | 102/102 X |
| 3,234,878 | 2/1966 | Precoul | 102/100 X |
| 3,316,842 | 5/1967 | Schulz | 102/100 |

*Primary Examiner*—Robert F. Stahl
*Attorney, Agent, or Firm*—Craig & Antonelli

[57]     ABSTRACT

The present disclosure is directed to a solid propellant charge for rocket engines having a short burning time, e.g. from 70 to 1,000 milliseconds which comprises a plurality of windings substantially equally spaced from one another at a prescribed distance, e.g. from about 0.2 to about 10 mm. and exhibiting a definite geometric shape, each of said windings consisting essentially of a supporting member embedded in an adhesive layer and a layer of propellant adhered to both sides of said adhesive layer.

43 Claims, 3 Drawing Figures

INVENTOR
HEINZ DILCHERT

ATTORNEYS

SOLID PROPELLANT CHARGE HAVING A SHORT BURNING TIME FOR ROCKET ENGINES

CROSS REFERENCE TO RELATED APPLICATIONS

The present application is a continuation-in-part application of application Ser. No. 874,881, filed Nov. 7, 1969 and now abandoned.

BACKGROUND OF THE INVENTION

The present invention relates to a solid propellant charge having a short burning time for rocket engines, for example in the millisecond range.

Usually, solid propellant charges having short burning times are produced from propellant films (foils) or from pressed profiles having very small profile wall thicknesses. In the zone of the usually occurring operating temperatures of about +50° C. to about −40° C., these thin-walled propellant charges incur a loss in dimensional stability with increased heating. Also their fragility (susceptibility to breakage) increases with increased cooling. Consequently, it is possible that these thin-walled propellant charges, during their combustion in the rocket combustion chamber, can be destroyed by the ignition impulse (thrust) as well as by the forces of the stream of combustion gas. In this situation, parts of the propellant are flung out of the rocket nozzle in the unburned condition which results in nonuniformities in thrust and efficiency.

SUMMARY OF THE INVENTION

An object of the present invention is to avoid the prior art disadvantages in providing a solid propellant charge having a short burning time for utilization in rocket engines.

Another object of the present invention is to construct a short-burning solid propellant charge in such a manner that it is safe from destruction as well as thermal deformation.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved propellant charge for rocket engines may be obtained by constructing the solid propellant charge as a number of layers, convolutions (windings), or the like, which are disposed at equally spaced distances from each other, i.e., open gaps. The propellant layers are supported by a supporting fabric embedded in an adhesive, such as a polyester, an epoxy resin, a polyurethane, or the like. On construction, a layer of the propellant is glued, cast (poured), or rolled on both sides of the adhesive layer in identical thickness. The supporting fabrics can be a metal, for example, a wire mesh or a nylon type fiber such as Perlon.

In a suitable further development of the present invention, it is suggested to attach the supporting fabric of the individual layers, convolutions, or the like, to a common holder, for example a plate. In this connection, one front edge of the supporting fabric is not provided with layers of propellant, and accordingly this edge is then connected, or cast together, with the holder plate, with the use of a suitable material, preferably a synthetic material. It is advantageous to employ for this purpose the adhesive utilized for embedding the supporting fabric.

In addition thereto, or also in place thereof one front edge of the supporting fabric may be equipped with a selvage or another type of reinforcement. This ensures a better anchoring in the synthetic material and thus a more satisfactory connection to the holding plate, and also, this type of construction makes it possible to merely brace the propellant charge, formed, for example, in numerous convolutions as a spiral coil, in the rocket combustion chamber against a perforated plate or the like disposed in the direction toward the nozzle, without the use of a special holder.

For the purpose of maintaining a definite gap or width between the individual layers, convolutions, or the like, of the propellant, which gap is of decisive importance for the internal constriction, i.e., the ratio of the burning surface to the gas exit cross section (throat) of the propellant charge, the present invention provides spacers extending in the longitudinal direction of the propellant charge between the individual layers, convolutions, or the like. These spacers are in the form of ribs integrally formed with the layers, convolutions, or the like.

In order to obtain or ensure equal pressure in each case in the individual gaps, the present invention also provides for connecting the gaps between the individual layers by means of holes through the layers of propellant. This can be done, for example, by leaving a more or less large number of places on the layers or convolutions free of adhesive and propellant, so that the meshwork of the supporting fabric functions as pressure equalization openings. It is also possible to provide special perforations in the fabric.

BRIEF DESCRIPTION OF THE DRAWINGS

The present invention will become more fully understood from the detailed description given hereinbelow and the accompanying drawings, which are given by way of illustration only and thus are not limitative of the present invention and wherein.

DESCRIPTION OF THE PREFERRED EMBODIMENTS

Figure 1:
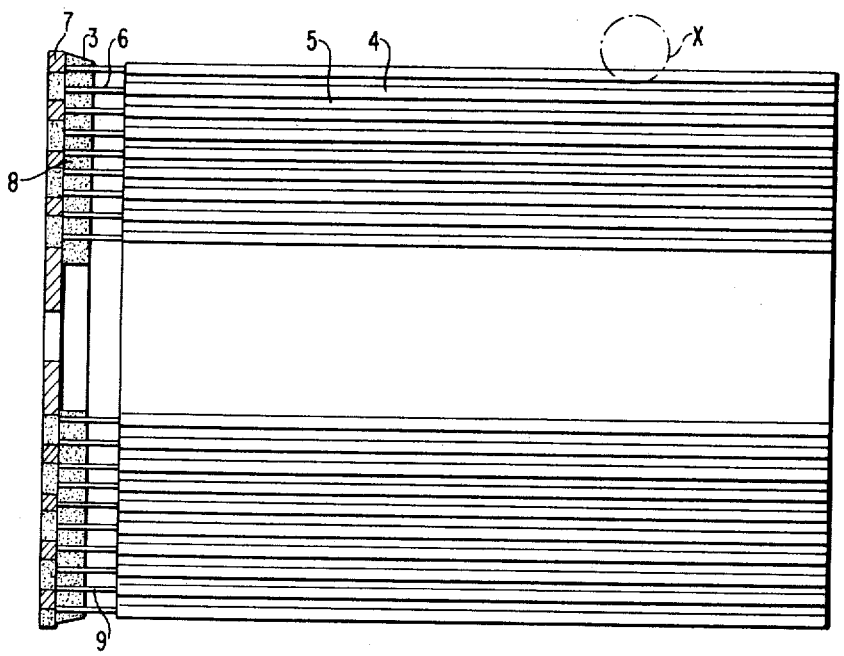
FIG. 1 shows a propellant charge having the configuration of a spiral coil, in a longitudinal, sectional view.
Figure 2:
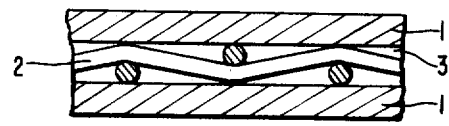
FIG. 2 shows a detail of FIG. 1.
Figure 3:
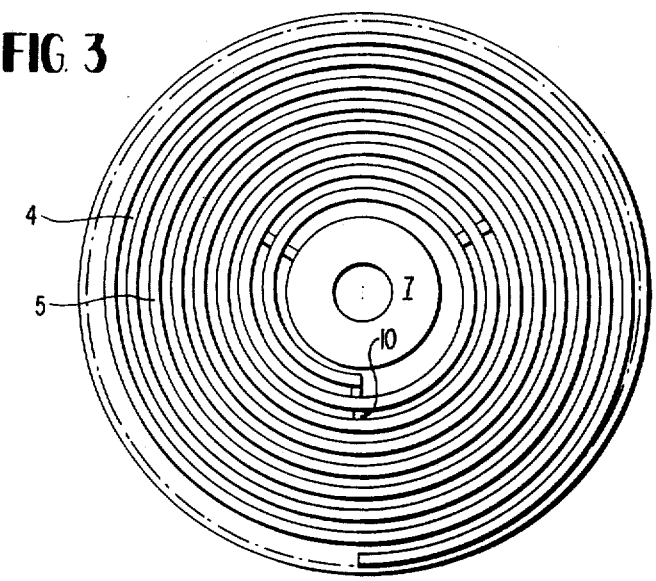
FIG. 3 shows the propellant charge in a plan view.

In the propellant charge of FIGS. 1–3, the supporting fabric 2, for example a wire mesh, is embedded in the adhesive 3, for example a two-component adhesive made of polyurethane so that both flat surfaces of the supporting fabric are covered by the adhesive. On both sides of the surfaces formed by the adhesive 3, the solid propellant layers 1 are secured, i.e., glued, cast (poured) or rolled in an identical and uniform minor thickness. The thus-produced, ready-for-use, propellant film (composite) is wound up in spiral shape. Between the individual windings 4, equally and uniformly spaced wide gaps 5 are maintained, said gaps being dimensioned in consideration of the required ratio of burning surface to the gas exit cross section (throat area). For example, depending on the configuration and amount of the total propellant charge, the gaps may vary from about 0.2 to about 10 mm. The coil of propellant film is connected, by the front end 6 of the supporting fabric 2, made for example of steel wire, with the holder 7, which is fashioned, for example, as a perforated metal plate by utilizing a suitable casting material. A particularly suitable casting material, in this connection, is a synthetic material, preferably the adhesive employed for embedding the supporting fabric 2. However, it is also possible to employ metals, for example lead.

Adjoining the cast base 8, the supporting fabric 2 is provided with the pressure equalizing openings 9 which can be fashioned as special perforations, or also as the mesh (loops, stitches, etc.) of the fabric kept free of propellant adhesive.

As indicated in FIG. 3, in order to ensure that a definite gap is maintained between the individual windings, spacers 10 are provided, extending in the longitudinal direction to the propellant charge and disposed at certain preferably uniform, intervals. These spacers can be made integrally with the propellant as well as with the adhesive employed for embedding the supporting fabric, or they can also be provided as separate elements of a different material. In any event, it is, of course, necessary to consider the influences exerted by the spacers on the burning surface or the ratio of burning surface to the gas exit cross section.

When mounting the coil of propellant in a rocket combustion chamber, which is not shown, it is advantageous to fill, with an inert material, the inside cross section (central column) of the propellant coil remaining after providing as small a radius of curvature as possible for the equipped propellant film. For example, a metallic rod can be inserted in the central column such that even in the zone of the internally disposed area of the innermost winding of the film, a comparable and definite gap 5 is maintained. Accordingly, at least approximate identical pressure conditions are ensured over the entire cross section of the propellant. A corresponding definite and comparable gap is also provided between the outermost layer of the propellant coil and the inner surface of the combustion chamber.

Instead of winding the propellant film in a spiral shape, it is, of course, also possible to wind it as a triangle, quadrangle, or polygon. Likewise, it is possible to arrange the films in several parallel layers rather than in a coil. In this connection, as seen in cross-section, the envelope can also represent a circle, a triangle, or a polygon. When employing individual, preferably planar, pieces of film, the mounting to a holder could be effected by providing corresponding grooves in a plate or the like, into which grooves the front ends of the individual film pieces are inserted and attached by gluing, casting, or in some other manner.

It will be understood that in optimally designed solid-propellant rocket engines, the fueling factor is limited by the so-called "internal nozzle-area ratio" ($K_i$).

The internal nozzle-area ratio is understood to mean the ratio of the burning surface of the propellant to the free gas throughflow cross section within the propellant charge. The internal nozzle-area ratio, in turn, is dependent on the so-called "external nozzle-area ratio" ($K_a$), namely the ratio of the burning area to the narrowest nozzle cross section of the thrust nozzle.

$K_a$ and $K_i$ must be adapted to each other in such a manner that the velocity and pressure characteristics correspond to the critical pressure ratio of the gases.

In a fuel gas having, for example, the ratio of specific heat of $c_p/c_v = 1.25$, the critical pressure ratio $(p/p_1)_{kr}$ is about 0.55, wherein $p$ is the combustion chamber pressure and $p_1$ is the pressure in the narrowest nozzle cross-section.

Accordingly, the ratio $K_i : K_a$ must be adjusted by estimate correspondingly.

In the case of the wound foil propellant charges of this invention with their narrow gas passage gaps, the value $K_i : K_a = 0.50$ is generally employed.

Actually, as an estimate, $K_i/K_a \approx 0.55$ could be assumed as permissible. Since, in view of the narrow flow cross sections in the coil-shaped propellant charge of this invention, the behavior of the gas flow is influenced to a considerable extent by the flow at or in the proximity of the burning propellant surface—in contrast, for example, to a stellate internal burner with its relatively large central flow channel wherein only a very small portion is affected by the flow along the wall. Therefore, as noted above, for precautionary purposes, in propellant grains from coiled foils is thus given by the following relationship: $K_i/K_a = 0.50$ Furthermore, in accordance with this relationship, the following definition applies: $K_i = \text{Area}_{burning}/\text{Area}_{flow}$ of the charge.

The following example illustrates how the gap width for a given propellant charge is determined:

Predetermined external nozzle-area ratio, $K_a = 400$
$K_i = 0.50 \times K_a = 200$
Length of propellant grain, selected $L = 50$ cm.

With $S =$ gap width between the surfaces of two successive windings,
$L =$ axial length of the coiled grain,
$U =$ so-called peripheral length of the coiled grain,
and considering the fact that the supporting fabric is provided on both of its sides with respectively one foil which burn toward each other, the following applies:

$$K_i = L \cdot U \cdot 2/S \cdot U$$

and from this results:

$$S = 2 \ L/K_i$$

Then, the required gap width $S$ in the wound propellant is calculated as follows:

$$S = 2 \cdot L/K_i = 2 \cdot 50/200 = 0.5 \text{ cm}.$$

If a smaller gap width than 0.5 cm. is selected, then overly high combustion pressures occur in the engine. Increased combustion chamber pressures entail the danger of an uncontrolled combustion and consequently an explosion of the engine.

An example for an engine design is as follows:

In accordance with this invention, an engine with the following engine data was designed, tested, and manufactured:

| Fuel: | Double-base rolled foils (i.e. explosive foils made by rolling) containing nitrocellulose and nitroglycerin | (identify composition) |
|---|---|---|
| | Burning rate (+20°C.) | = 11.4 mm./sec. |
| | Specific impulse | = 197 kp. sec./kg. |

| Grain: | Length | L | = 33.6 cm. |
| --- | --- | --- | --- |
| | Foil thickness | | = 4.0 mm. |
| | Burning area | | = 21,840 cm² |
| | Gap width | S | = 4.0 mm. |
| Supporting Fabric: | Wire mesh of galvanized steel | | |
| | Wire thickness | | = 0.25 mm. |
| | Mesh width | | = 1.40 mm. |
| Engine: | External nozzle-area ratio, $K_a$ | | = 424 |
| | Internal nozzle-area ratio, $K_i$ | | = 168 |
| | Narrowest nozzle cross section | | = 51.66 cm² |
| | Thrust, at +20°C. | | = 7,750 kp. |
| | Burning time, at +20°C. | | = 0.35 sec. |
| | Combustion pressure, at +20°C. | | = 100 atm. gauge |

In this grain, the gap width S is not optimally designed, at 4 mm. The smallest feasible gap width can be 3.2 mm.

$S = 3.2$ mm. results with $K_i = 0.5 \, K_a = 212$.

This is the optimum design, since thereby the largest amount of fuel is accommodated in the given combustion chamber, i.e., the fueling efficiency has reached its maximum value.

It will be appreciated that the rocket propellants suitable for purposes of this invention include all rocket propellants which can be applied by molding or bonding on a support fabric and which in those cases where a propellant cable is to be made can be wound spirally without crack formation after possible prior heating. As examples of these propellants there may be mentioned single base propellants such as nitrocellulose foil, multibase propellants such as for example nitrocellulose and nitroglycerine and the known U.S. rocket propellants N5, N8 and N12 and composite propellants of for example ammonium perchlorate and polyurethane or ammonium nitrate and polybutadiene.

In case of gap widths being too small, very high pressures arise which may lead to destruction of the propulsive unit. In case of gap widths being too large on the other hand, only the filing or charge factor of the combustion chamber is reduced, whereas the combustion itself and the operation of the propulsive unit as such will not be influenced.

The invention being thus described, it will be obvious that the same may be varied in many ways. Such variations are not to be regarded as a departure from the spirit and scope of the invention, and all such modifications as would be apparent to one skilled in the art are intended to be included.

What is claimed is:

1. A solid propellant charge for rocket engines having a short burning time comprising a plurality of spaced support layers arranged to together define a definite geometric shape in the direction perpendicular to said support layers, an adhesive layer attached to each support layer in such a way that each support layer is embedded in its respective adhesive layer, and a layer of propellant covering each side of each adhesive layer, the spacing of said support layers and the amounts of adhesive and propellant on said support layers being so selected that each propellant-covered layer is spaced from adjacent propellant-covered layers by substantially equidistant gaps, whereby loss of dimensional stability of said charge with increasing temperature and breakage of said charge with decreasing temperature are substantially prevented.

2. The solid propellant charge of claim 1, wherein said support layers are made from fabric.

3. The solid propellant charge of claim 1, wherein the size of said gaps and the amounts of said propellants are so selected that said charge has a burning time in the millisecond range.

4. The solid propellant charge of claim 3, wherein said millisecond range is about 70 to 1,000 milliseconds.

5. The solid propellant charge of claim 1, wherein each of said support layers define said geometric shape in right cross section.

6. The solid propellant charge of claim 5, wherein the geometric shape is a circle.

7. The solid propellant charge of claim 1, wherein said layers are made from a metallic material.

8. The solid propellant charge of claim 6, wherein said metallic material is in the form of a wire mesh.

9. The solid propellant charge of claim 1, wherein said layers are made from nylon fibrous material.

10. The solid propellant charge of claim 1, wherein said adhesive layer is selected from the group consisting of a polyester, a polyurethane and an epoxy resin.

11. The solid propellant charge of claim 1, wherein the propellant is glued to, cast on or rolled on both sides of the adhesive layer.

12. A solid propellant charge for rocket engines having a short burning time comprising a plurality of spaced support layers arranged to together define a definite geometric shape in the direction perpendicular to said support layers, an adhesive layer attached to each support layer in such a way that each support layer is embedded in its respective adhesive layer, a layer of propellant covering each side of each adhesive layer, and support means attached to at least two of said support layers for maintaining said support layers parallel to one another, the spacing of said support layers and the amounts of adhesive and propellant on said support layers being so selected that each propellant-covered layer is spaced from adjacent propellant-covered layers by substantially equidistant gaps, whereby loss of dimensional stability of said charge with increasing temperature and breakage of said charge with decreasing temperature are substantially prevented.

13. The solid propellant charge of claim 12, wherein said support means is a plate and further wherein the end portions of adjacent ends of said support layers on one side of said solid propellant charge are attached to said plate.

14. The solid propellant charge of claim 13, wherein said adjacent end portions of said support layers are attached to said plate by an adhesive material.

15. The solid propellant charge of claim 14, wherein said adhesive material is selected from the group consisting of polyester, polyurethane and epoxy resins.

16. The solid propellant charge of claim 15, wherein the adhesive attaching said support layers to said plate is the same adhesive embedding said support layers.

17. The solid propellant charge of claim 14, wherein each of said support layers is fibrous and provided at one end thereof with a selvage for reinforcement.

18. The solid propellant charge of claim 14, wherein said plate contains grooves adapted to receive the end portions of said support layers.

19. The solid propellant charge of claim 1, further including longitudinally extending spacer members positioned between respective pairs of support layers to maintain same spaced apart.

20. The solid propellant charge of claim 1, wherein said layers define pressure equalizing openings to provide communication between the gaps between said support layers.

21. The solid propellant charge of claim 1, wherein said layers are in the form of a spiral coil.

22. The solid propellant charge of claim 21, wherein said spiral coil is formed from a unitary integral support sheet.

23. The solid propellant charge of claim 1, wherein said layers form a coil having an open center, said solid propellant charge further comprising a body of inert material generally congruent in cross section with said open center and positioned in said open center such that an equal spacing is maintained between said inert material and the inside surfaces of said open center.

24. The solid propellant charge of claim 23, further including a combustion chamber, said charge being positioned in said chamber in such a way that equal spacing is maintained between the outermost layer of said charge and the inner surface of said combustion chamber.

25. The solid propellant charge of claim 1, wherein said layers are circular.

26. The solid propellant charge of claim 1, wherein said geometric shape is a polygon.

27. The solid propellant charge of claim 1, wherein said plurality of support layers are substantially parallel with one another.

28. The solid propellant charge of claim 1, further including spacer members positioned between respective pairs of support layers for maintaining said support layers apart and parallel to one another.

29. The solid propellant charge of claim 1, wherein the thicknesses of the adhesive layers embedding the respective support layers are substantially identical, and further wherein the thicknesses of the propellant layers are substantially equal.

30. The solid propellant charge of claim 1, wherein said equidistant gaps have a thickness of about 0.2 to 10 mm.

31. The solid propellant charge of claim 1, wherein the layer of adhesive is about 4 mm thick.

32. The solid propellant charge of claim 1, further including support means between adjacent support layers for maintaining said support layers spaced apart in said definite geometric shape.

33. The solid propellant charge of claim 32, wherein a plurality of said support means are arranged in said charge at uniform intervals from one another.

34. A solid propellant charge for rocket engines having a short burning time in the millisecond range which comprises a plurality of substantially parallel propellant containing layers uniformly spaced from one another with equidistant gaps therebetween, said propellant-containing layers being arranged in a definite shape and comprising a fabric supporting member, a layer of adhesive embedding said fabric, and a layer of solid propellant uniformly covering each side of said adhesive layer.

35. The solid propellant charge of claim 34, wherein said plurality of parallel propellant-containing layers together form a spiral winding.

36. The solid propellant charge of claim 34, wherein said spiral winding is formed from an integral unitary supported propellant-containing layer.

37. The solid propellant charge of claim 34, further including spacer means positioned between said supported propellant-containing layers for maintaining said layers spaced apart.

38. The solid propellant charge of claim 34, wherein said supported propellant-containing layers are separate, spaced apart, individual circular members.

39. The solid propellant charge of claim 34, wherein said supported propellant-containing layers are spaced from one another by a distance of about 0.2 to 10 mm.

40. The solid propellant charge of claim 34, wherein the thicknesses of the adhesive layers embedding the respective support layers are substantially identical, and further wherein the thicknesses of the propellant layers are substantially equal.

41. A solid propellant charge for rocket engines having a short burning time comprising a support sheet having a longitudinal and transverse direction, said support sheet so arranged that it defines in cross section in said transverse direction a spiral with the overlapping portions of said support sheet being parallel to one another in said longitudinal direction, an adhesive layer uniformly enveloping said support sheet, and a layer of propellant uniformly covering each side of the adhesive layer, the spacing of each overlapping portion of said support sheet with respect to adjacent portions of said support sheet and the amounts of adhesive and propellant on said support sheet being so selected that each propellant-covered portion of said support sheet is spaced from adjacent propellant-covered portions of said support sheet by substantially equidistant gaps, whereby loss of dimensional stability of said charge with increasing temperature and susceptibility to breakage of said charge with decreasing temperature are prevented.

42. The solid propellant charge of claim 41, wherein said support sheet is integral.

43. A solid propellant charge for rocket engines having a short burning time which comprises a plurality of propellant-containing windings substantially equally spaced from one another with gaps therebetween and arranged in a definite geometric shape, each of said windings including a supporting member embedded in an adhesive layer and a layer of propellant adhered to both sides of said adhesive layer.

* * * * *